United States Patent
Anderson

(10) Patent No.: US 6,247,360 B1
(45) Date of Patent: Jun. 19, 2001

(54) ASPIRATED RADIATION SHIELD FOR WEATHER SENSOR

(75) Inventor: Richard C. Anderson, San Jose, CA (US)

(73) Assignee: Davis Instruments, Hayward, CA (US)

( * ) Notice: Subject to any disclaimer, the term of this patent is extended or adjusted under 35 U.S.C. 154(b) by 0 days.

(21) Appl. No.: 09/321,500

(22) Filed: May 27, 1999

(51) Int. Cl.$^7$ ..................................................... G01W 1/00

(52) U.S. Cl. ................................................. 73/170.27

(58) Field of Search .................... 73/384, 431, 170.16, 73/170.17, 170.26, 170.27

(56) References Cited

U.S. PATENT DOCUMENTS 5,591,907 * 1/1997 Stein et al. ...................... 73/170.16

* cited by examiner

*Primary Examiner*—William Oen
(74) *Attorney, Agent, or Firm*—Townsend and Townsend and Crew LLP

(57) ABSTRACT

A cylindrical housing is provided with outside protecting louvers and central cylindrical aspirated flow paths. First, the surrounding louvers are circular and slope downward at their cylindrical inner and outer edges so as to deflect radiation outwardly of the shield and permit cooling by ambient wind. Second, these surrounding louvers along the upper surface are each provided with vertical convection flow apertures to permit natural convection currents. Third, the housing and the louvers are given a small spatial separation to prevent heat conduction. Fourth, a motor driven fan is placed at the top of the central cylindrical flow path. Air is drawn from the bottom of the housing at a screen-guarded circular opening. Air then passes around an aerodynamically shaped radiation baffle into the sensor chamber of the shield. Fifth, air drawn between the walls of the protecting housing is drawn along at least two flow paths. A first flow path travels along the length of the inside surface of the outer wall of the housing. A second cylindrical-shaped stream of traveling air provides cooling to the wall immediately surrounding the measuring sensor. Finally, a solar powered fan motor and battery circuit is provided with a resistor in series with the battery. The fan motor powering circuit enables increased aspiration during direct sunlight hours, limits solar cell charging current to the during sunlight hours, and finally reduces discharge current during non sunlight hours to prolong battery driven fan operation. Maximum accuracy of temperature and humidity measurement is enabled.

9 Claims, 4 Drawing Sheets

ASPIRATED RADIATION SHIELD FOR WEATHER SENSOR

This invention relates to an aspirated radiation shield for weather sensors. More particularly, a solar powered aspirated shield is disclosed for day and night operation where atmosphere to be measured is drawn into and across the measuring sensors along a path shielded from the effects of outside radiation.

As used in this disclosure, the word "sensor" describes that portion of a weather instrument that directly measures the desired weather parameter, usually temperature or humidity. It may or may not include the rest of the weather instrument, for example such as the required processing and conversion of the analog data at the sensor to the digital readout required by the user.

BACKGROUND OF THE INVENTION

Weather stations for home, agricultural, and industrial use have become increasingly numerous. In such stations, two of the most common measurements taken relate to humidity and temperature. Unfortunately, placement of the measuring sensors is critical. Users of such measuring sensors frequently must place the measuring sensors where thermal radiation conditions can and do create measurement error, especially as related to temperature and humidity. In certain shields for weather sensors, low wind speeds (for example fewer than five miles per hour), can cause obvious errors in temperature measurement. These errors can be quite large—in the range of 5° Centigrade.

Because these weather sensors must be placed in locations where incident radiation effects can introduce error into the desired measurement; the prior art has tried to provide the measuring sensor within a protecting shield. These devices are either passive shields, relying on natural ventilation provided by the wind, or active shields having a fan-induced air flow.

Regarding such passive shields, it is known to place weather sensors in cylindrically shaped louvered housings. The louvers are intended to block radiation from affecting the reading of the sensors. At the same time, these louvers allow the naturally occurring wind to ventilate the chamber containing the sensors.

Unfortunately, at very low wind speeds, these passive sensor shields loose their effectiveness. The louvers are heated by solar radiation. When the louvers become hot, their heat is passed on to the contained sensors.

As radiation effects are reversible, both day and night measurements are affected. The night sky is a cold radiation "sink."

It is known to provide aspirated housings for weather sensors. In such shields, a fan typically draws air through the shield past a measuring sensor. The outer wall of the ventilated chamber is not shielded from solar radiation. High aspiration rates are required for the heat to be drawn off.

Alternately, in forced ventilation sensors, it is known to draw air over radiation deflecting louvers to a centrally contained sensor. Unfortunately, when the radiation deflecting louvers become warm, the air being drawn over the louvers is heated. Sensor error can result.

SUMMARY OF THE INVENTION

A cylindrical housing is provided with a passive shield of outside protecting louvers and central aspirated flow paths for sensor measurement. First, the surrounding louvers are circular and slope downward at their cylindrical edges so as to deflect radiation outwardly of the shield. Second, these surrounding louvers permit natural ventilation by horizontally blowing wind. Along the upper surface the louvers are each provided with apertures which enables natural convection. This natural convection reduces the tendency of relatively warm air to become trapped within the louvers. Third, the housing and the louvers are given a small spatial separation. To the extent that heating of the louvers occurs, such heat is prevented from having a direct conductive flow path to the central cylindrical housing containing the sensor. Thus, the central cylindrical housing shielded by the louvers provides another layer of insulation. Fourth, a motor driven fan is placed at the top of the central cylindrical flow path. Air is drawn from the bottom of the housing at a screen-guarded circular opening. Air then passes around an aerodynamically shaped radiation baffle into the sensor chamber of the shield. Radiation from below the shield is prevented from having a direct path to the sensor. Fifth, air is also drawn into the walls of the protecting housing along two flow paths. These two paths lie in two concentric spaces between three walls of the sensor chamber. Finally, a solar powered fan motor and battery circuit is provided with a resistor in series with the battery. The fan motor powering circuit enables increased aspiration during direct sunlight hours, limits solar cell charging current to the during sunlight hours, and finally reduces discharge current during non sunlight hours to prolong battery driven fan operation. Maximum uniformity of temperature and humidity measurement is provided.

An advantage of this aspirated design is that air is not drawn over heated surfaces to the sensor. For example, unlike those prior art aspirated shields that draw air over radiation deflecting surfaces, heating of the air routed to the sensor cannot occur.

It is an additional advantage to combine both passively-ventilated shielding with the aspirated shield of this invention. This combination allows relatively low air speeds to be used in the aspiration. As a direct consequence of this construction, fan motor power can be drastically reduced over that found in the prior art. By way of example, in the preferred embodiment of this invention, the motor runs at 0.16 watts during insolation under full sunlight and at 0.08 watts at night.

DESCRIPTION OF THE SPECIFIC EMBODIMENTS

Figure 1:
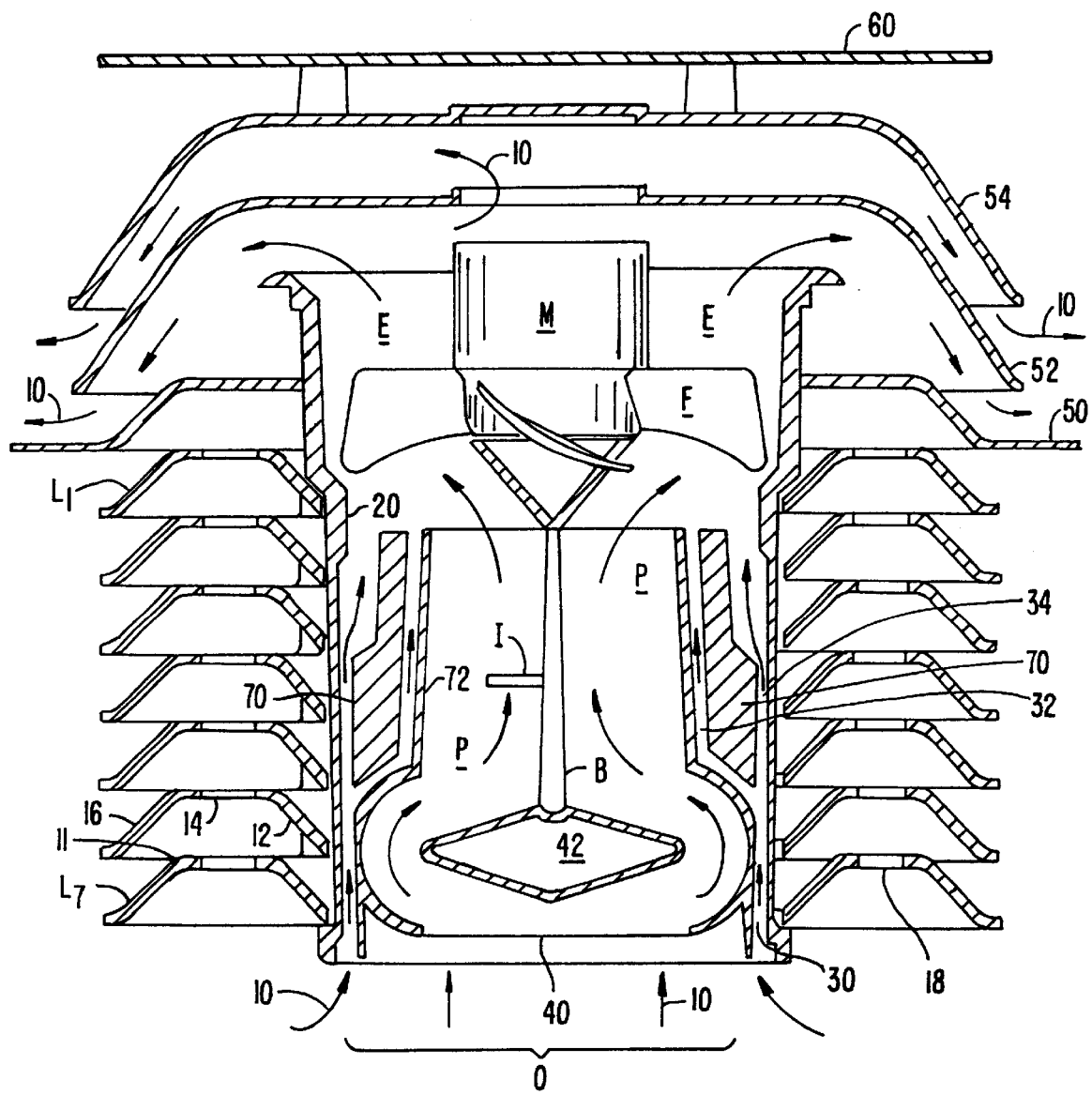
FIG. 1 is a side elevation section illustrating the flow paths.
Figure 2A:
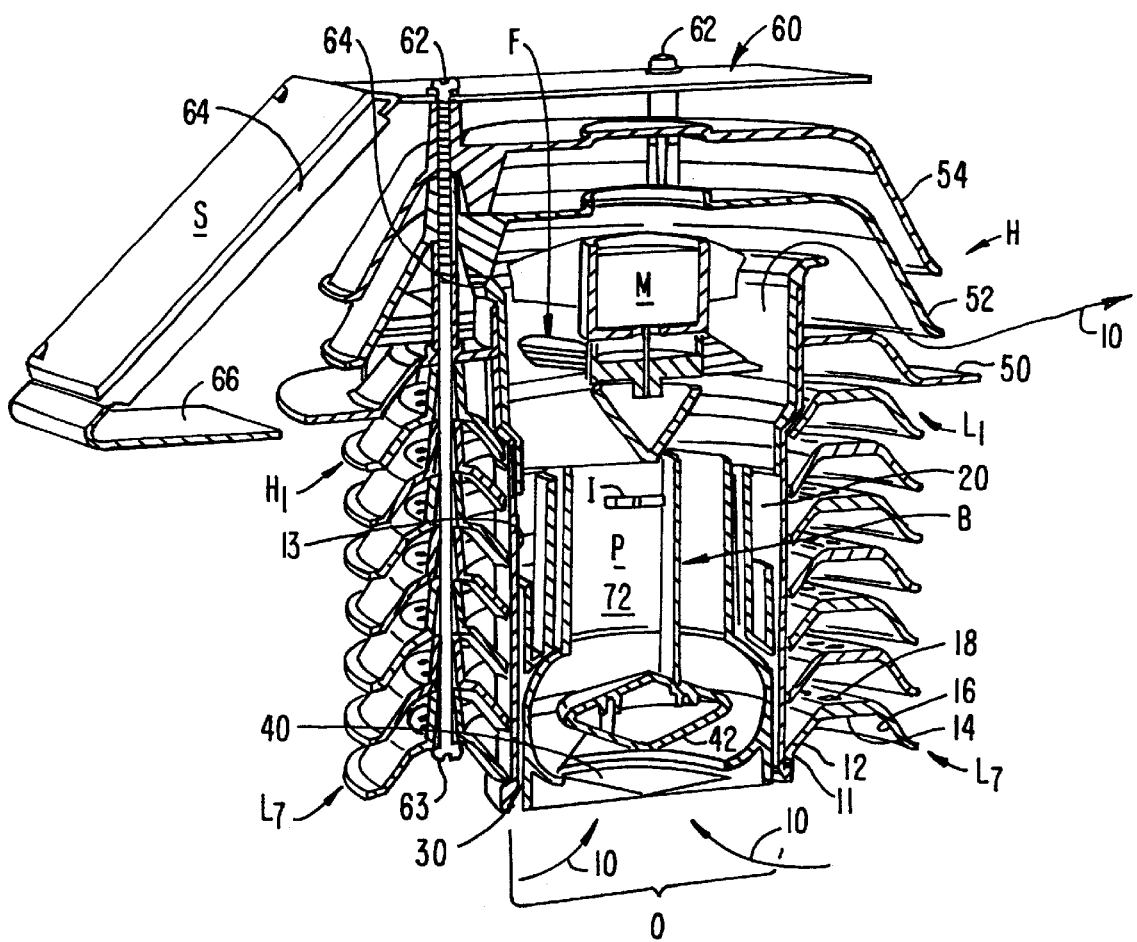
FIG. 2A is a side elevation section in perspective illustrating in particular in internal measurement flow path, the placement of the measuring weather sensors, and the exterior solar cell used for the powering of the fan motor of the invention.
Figure 2B:
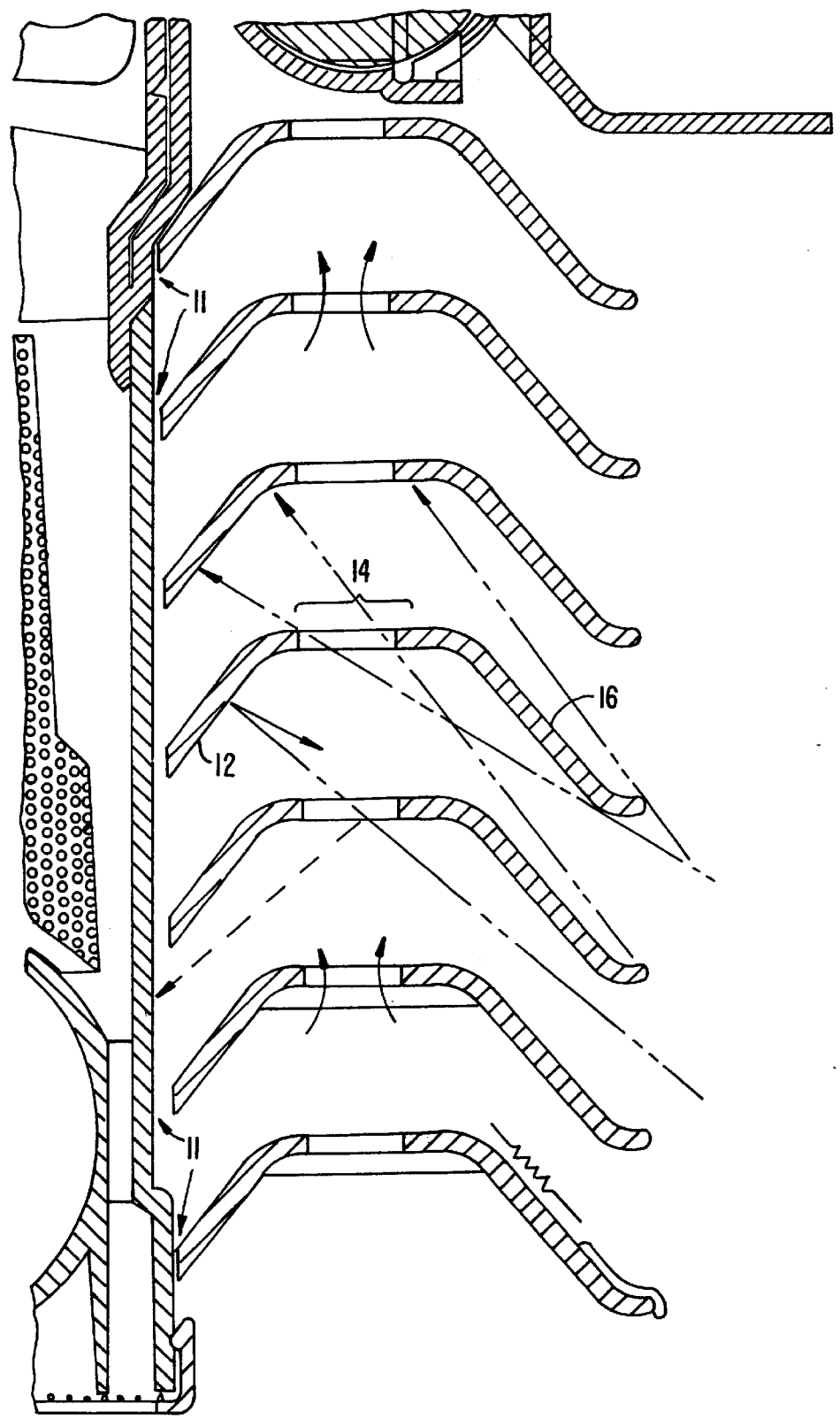
FIG. 2B is an expanded side elevation illustrating the separation of the louvers from the housing through which atmosphere to be sensed passes; and, FIG. 3 is an electrical schematic illustrating the placement of a resistor in series.

Referring to the side-elevation section of FIG. 1 and the side-elevation section perspective view of FIGS. 2A and 2B, the shield of this invention can be understood. First, housing H is shown in section exposing central measurement flow path P. The sensor(s) S are mounted on board B. In the preferred embodiment, measuring sensors I are shown disposed in central measurement flow path P on a printed-circuit board. The illustrated circuit board is not required. A simple mounting plate may be used. The purpose of this disclosure is to allow the disclosed shield to protect measuring sensors I to be virtually unaffected by the thermal radiation exterior to housing H.

Louvers L1–L7 are provided to shade exterior of housing 20. Each louver L is separated by a small spatial interval 11 from a cylindrical central housing 20. Should the radiation deflecting louvers become heated, the louvers are prevented from having a direct conductive flow path to cylindrical central housing 20.

Louvers L each further include upwardly sloped surface 12, flat upper surface 14, and finally downward sloped surface 16. The louvers are reinforced at intervals by radial vanes 17. In the absence of anything further, it can be seen that the purpose of louvers L is to reflect incident radiation coming from all directions except directly underneath while also permitting maximum cooling of wall 20 by natural ventilation. It will further be seen that any radiation failed to be reflected by outer downward sloped surfaces 16 will be deflected by inner upward sloped surfaces 12.

Louvers L are provided with flow apertures 18 all around their disposition about housing 20. This enables any hot-trapped air captured by louvers L to gradually pass upwardly.

It will be understood that in some prior art constructions, the louvers have defined the flow path to circuit board B and measuring sensors I. It will be seen that in this construction, air heated by passing over the louvers is not drawn into the sensor chamber. Any such air that finds its way to opening 40 will be drawn onto the two concentric flow paths in the walls around the sensor chamber.

Second, it will be seen that housing H central cylindrical member 20 serves as a complete barrier preventing all flow from the louvers L1–L7 to central measurement flow path P. At the same time, louvers L1–L7 prevent the direct incidence of sunlight on central cylindrical member 20.

Third, it is important to note the position of fan F and motor M with respect to central measurement flow path P, circuit board B, and measuring sensors I. Fan F and motor M are placed at the top of central measurement flow path P and arranged to entrain atmosphere 10 from the bottom to the top of central measurement flow path P. Thus, any radiative heating from motor M and any Joule heating from fan F has no effect on any measurement being taken.

Fourth, the reader will observe that adjacent opening O at the bottom of housing H and in the vicinity of sensor I, three concentric flow paths are provided. The outer flow path 30 flows within the walls of the sensor chamber O. This path extends a short distance upward to a baffle divider 70. At baffle divider 70, flow path 30 is divided into inner concentric flow path 32 and outer concentric flow path 34. These two inner concentric flow path 32 and outer concentric flow path 34 pass around that portion of the central cylindrical member 20 containing sensor(s) I. Finally, flow from inner concentric flow path 32 and outer concentric flow path 34 is drawn toward fan F and motor M. These flows never come into contact with sensor(s) I. Thus, central measurement flow path P is provided with a moving and surrounding airflow providing in effect three air-cooled walls. Those air-cooled walls are cylindrical member 20, dividing baffle 70, and sensor chamber wall 72.

Fifth, it will be seen that atmosphere 10 entering central measurement flow path P first passes through screen 40. Screen 40 prevents ingress of insects.

Sixth, and after passing through screen 40, atmosphere 10 is deflected around aerodynamically shaped circular circuit board supporting base 42. This circular circuit board supporting base 42 provides a radiation reflecting shield to inhibit radiation from below the shield from being incident on measuring sensor(s) I. At the same time, circular circuit board supporting base 42 enables firm mounting of circuit board B or any other structure to which sensor I is attached.

The exhaust flow path E is easy to understand. After passing through fan F and around motor M, atmosphere 10 is diverted to escape between cap 54, and exit louver 50. Approximately evenly divided atmosphere 10 flow occurs from fan F and out between exit louver 50 and intermediate cap 52, and through intermediate cap 52 and immediately below cap 54. Note that louvre 50 extends out beyond caps 52 and 54. This extension deflects the exhaust air, sending it in a horizontal direction, so it does not tend to return to the air inlet 10. Thus as a shield against radiation from above the measuring sensors I at central measurement flow path P, there are provided three layers of shielding: two caps cooled by constantly flowing layers of exhausting atmosphere 10 plus mounting plate 60.

Figure 3:
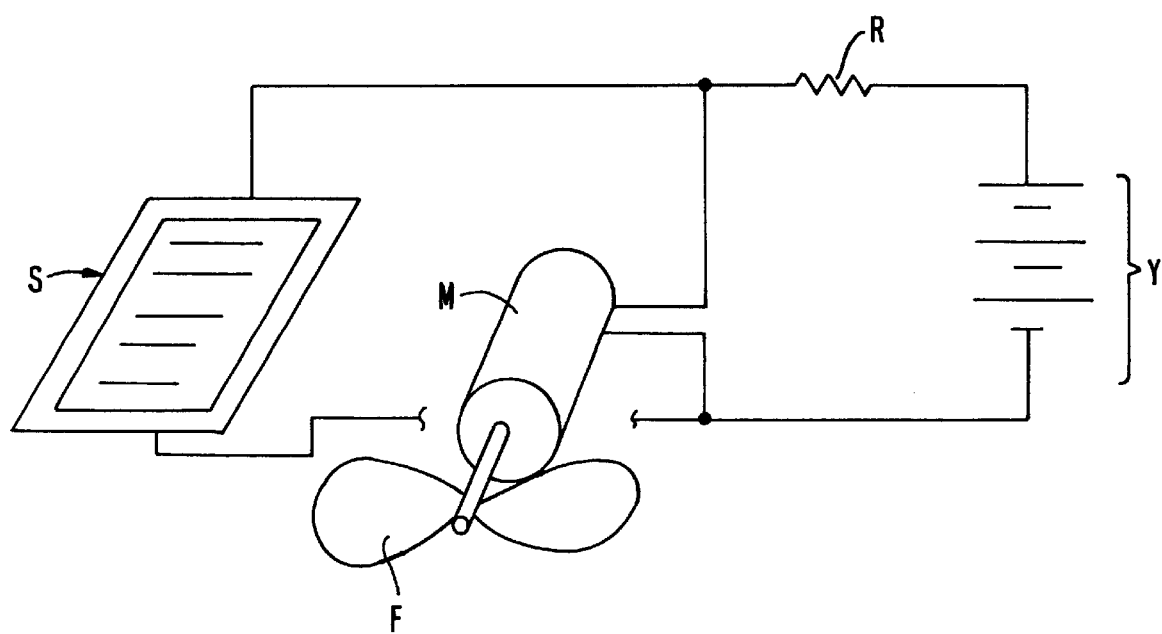

Having set forth the mechanical construction, attention can now be devoted to the electrical circuit illustrated in FIG. 3. Simply stated, solar cell S is placed in parallel with motor M and fan F. It will be understood that when solar radiation is incident on solar cell S, motor M will power fan F.

Also in parallel with motor M is resistor R and battery Y. Naturally, and during fall daylight hours, resistor R limits the charging current into battery Y. During daylight hours, solar cell S causes both motor M to run and battery Y to charge.

When night falls, solar cell S no longer has incident radiation and becomes a high resistance. This effectively reduces the circuit to a series circuit with battery Y and resistor R in series with motor M. Running of motor M and fan F at a relatively low speed occurs enabling powering of motor M during hours of darkness. At the same time, power within battery Y is conserved.

It is to be understood that the solar cell and battery are not required. Motor M can as well be powered by a DC power source of any kind, including an AC connected rectifier.

Support of housing H and solar cell S can be easily understood. Typically a support bracket 60 is provided through which top support screws 62 mount. In the embodiment here shown, bottom support screws 63 extend from the bottom of louver L7 upward to a threaded spacer 64. Threaded spacer 64 threads to top support screw 62 at the upper end, and bottom support screw 63 at the lower end. These respective screws and spacer tie the unit together.

Bracket 60 is provided with angled section 64, on which angled section 64 solar cell S is mounted. Solar cell S is given exposure to daylight insolation. Preferably, the backside of solar cells S overlies an aperture 68 in angled section 64 so that atmosphere exhausted from the shield can keep solar cell S cool.

The shield is mounted by attachment of plate 60 to a horizontal member or to a mounting bracket. Bracket 60 provides a third radiation-reflecting layer protecting against radiation incident from above the shelter.

What is claimed is:

1. A radiation shield for weather sensors comprising in combination:

a housing defining an internal vertical flow path for aspirated air;

the housing defining a volume for the placement of at least one weather sensor;

a plurality of radiation deflecting surfaces surrounding the housing, the radiation-deflecting surfaces having flow apertures defined therein to permit passage of convention currents through the radiation deflecting surfaces independent of the internal vertical flow path;

a powered fan mounted at one end of the housing for drawing air from the other end of the housing to the fan and then out of the vertical flow path; and, a support for supporting a weather measuring sensor in the vertical flow path away from the fan whereby atmosphere drawn by the fan into the vertical flow path passes over the weather sensor to enable measurement of parameters of the passing air.

2. A radiation shield for weather sensors according to claim 1 and comprising in further combination:

the series of peripheral louvers is spatially separated from the housing to prevent a direct conductive flow path to the housing.

3. A radiation shield for weather sensors according to claim 1 and comprising in further combination:

the internal vertical flow path includes a baffle divider around the weather measuring sensor in the vertical flow path, the baffle divider defining inner and out air cooling flow paths;

the inner and outer air cooling flow paths cooling a plurality of walls surrounding the internal vertical flow path around the weather sensor.

4. A radiation shield for weather sensors according to claim 1 and comprising in further combination:

the powered fan is an electrically powered fan.

5. A radiation shield for weather sensors according to claim 4 and comprising in further combination:

the electrically powered fan is powered by a solar cell.

6. A radiation shield for weather sensors comprising in combination:

a housing defining an exterior and an internal vertical flow path for placement of at least one weather sensor;

a plurality of discrete concentric walls defined interior of the housing, the discrete concentric walls separated by spatial intervals to permit passage of cooling air around the walls and independent of the internal vertical flow path for the placement of at least one weather sensor;

a powered fan mounted at one end of the housing for drawing air from the other end of the housing to the fan and then out of the vertical flow path; and, a support for supporting a weather measuring sensor in the vertical flow path away from the fan whereby atmosphere drawn by the fan into the vertical flow path first passes over the weather sensor to measure weather parameters from the passing air surrounded by the housing and the layer of atmosphere insulation and second through the fan.

7. A radiation shield for weather sensors according to claim 6 comprising in further combination:

a plurality of radiation deflecting surfaces surrounding the housing, the radiation deflecting surfaces having flow aperture defined therein to permit passage of air through the radiation deflecting surfaces independent of the internal vertical flow path for the placement of at least on weather sensor.

8. In combination with:

a housing defining an internal vertical flow path for placement of at least one weather sensor an electrically powered fan mounted at a first end of the housing for drawing air from a second end of the housing to the electrically powered fan and then out of the vertical flow path;

the improvement of an electrical power source for the electrically powered fan comprising:

a solar cell;

a battery;

a circuit for maintaining the solar cell and the battery in parallel with the electrically powered fan; and, a resistor in series with the battery and the electrically powered fan to lower driving current to the electrically powered fan when the solar cell does not have incident insolation, provide greater driving current to the electrically powered fan when insolation is incident on the solar cell, and limit charging current to the battery during the incidence of insolation on the solar cell.

9. The combination of claim 8 and including:

a plurality of radiation deflecting surfaces surrounding the housing, the radiation deflecting surfaces having flow aperture defined therein to permit passage of cooling air through the radiation deflecting surfaces independent of the internal vertical flow path for the placement of at least one weather sensor.

\* \* \* \* \*